F. S. PATTISON.
VEHICLE WHEEL PULLING JACK.
APPLICATION FILED NOV. 10, 1916.
1,243,546.    Patented Oct. 16, 1917.
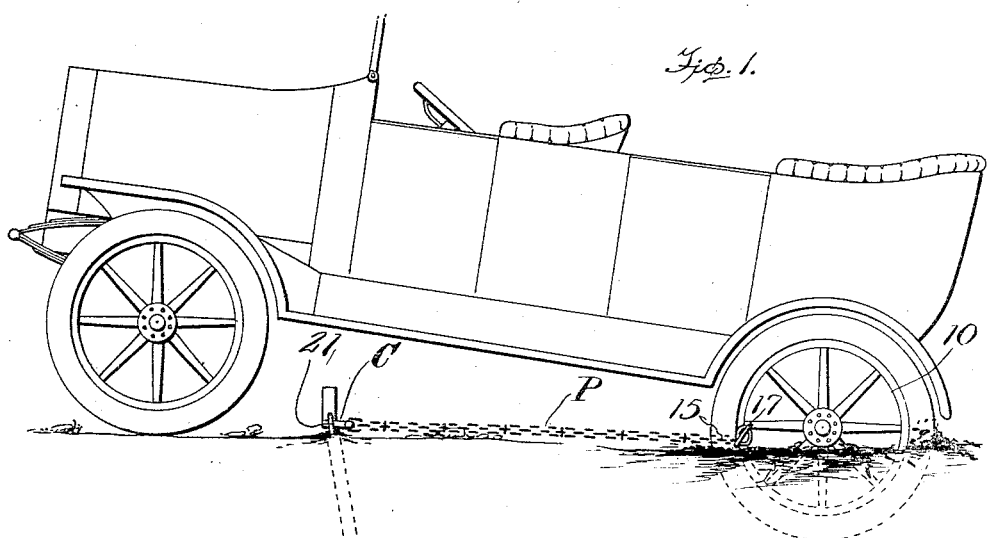
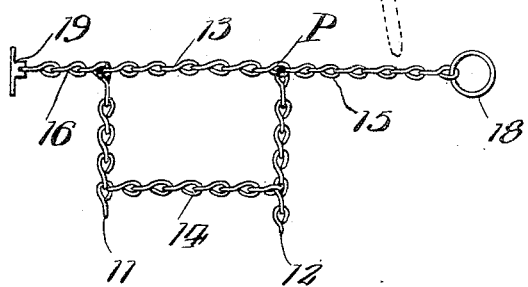
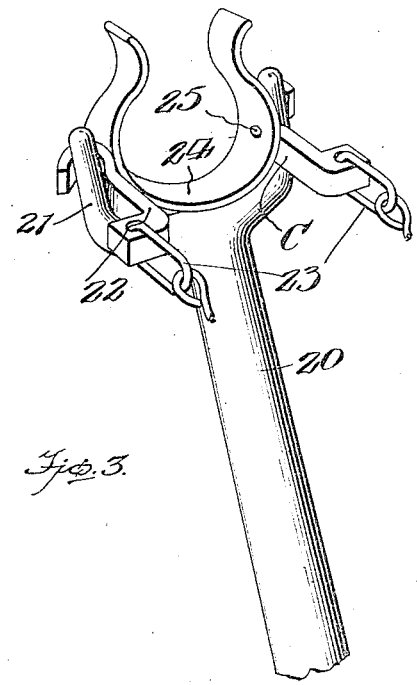
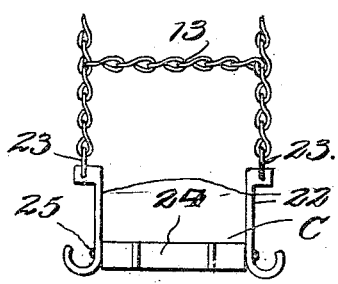
F. S. Pattison,
Inventor
By Geo. P. Kimmel
Attorney

UNITED STATES PATENT OFFICE.

FREDDRICK S. PATTISON, OF MERRITTON, ONTARIO, CANADA.

VEHICLE-WHEEL PULLING-JACK.

1,243,546.                Specification of Letters Patent.    Patented Oct. 16, 1917.

Application filed November 10, 1916. Serial No. 130,613.

*To all whom it may concern:*

Be it known that I, FREDDRICK S. PATTISON, a citizen of the United States, residing at Merritton, in the Province of Ontario and Dominion of Canada, have invented certain new and useful Improvements in Vehicle-Wheel Pulling-Jacks, of which the following is a specification.

The present invention relates to winding and reeling and has particular reference to new and useful improvements in devices for removing motor vehicles from difficult positions existing when a vehicle becomes mired in soft earth, it being impossible for the vehicle driving wheels to obtain any tractive effort owing to the depth to which the same become embedded. Under such conditions it is practically impossible to move the vehicle from the stalled position without the assistance of another vehicle.

It is therefore an object of my invention to provide an article which may be attached fixedly to a point upon one of the driving wheels embedded and to a point in good ground near the front or rear of the vehicle so that when power is applied to the driving wheels a fixed point of power application may be obtained. I also contemplate the provision of a flexible trackway upon which the driving wheel or wheels may move when withdrawing the vehicle from the stalled position.

Another object of my invention is to provide an article of the class described which may be carried in any tool chest on a motor vehicle, is light in weight, occupies a minimum amount of space, is cheap to manufacture and unfailing in operation. My invention also contemplates the provision of an article which to use requires no previous experience or mechanical skill.

Other objects and advantages to be derived from the use of my improved invention will appear from the following detailed description and the claims, taken with an inspection of the accompanying drawing, in which:

Figure 1 is a side elevational of a motor vehicle showing my invention applied to one of the driving wheels thereof;

Fig. 2 is a fragmental elevational view of the flexible trackway and pulling element of my invention; and Fig. 3 is a fragmental perspective view of the ground engaging member and connecting element.

Referring more particularly to the drawing, wherein similar characters of reference designate like and corresponding parts throughout the various views, 10 designates the driving wheel of a motor vehicle, which, as will be apparent from an inspection of Fig. 1, is shown mired in soft earth.

My invention includes a trackway and pulling element P composed of chain sections embodying side portions 11 and 12, end portions 13 and intermediate portions 14 arranged transversely thereof. To connect one end of the trackway element P to the wheel 10 I provide a pair of short chains 15 and 16 adapted to encircle the felly and tire of a wheel preferably at the rear of one of the spokes. The chain 15 carries a ring 18 and the chain 16 a T-shaped connector 19 to engage the ring when the chains encircle a tire as indicated at 17 in Fig. 1.

The ground engaging element of my invention includes a stake 20 preferably formed of metal and having a U-shaped head forming arms 21. A connector generally designated C is carried by the free end of the member P, said member C having parallel hooks 22 provided with openings to be engaged by the endmost connecting links 23 of the side portions 11 and 12 of said member P. The hooks 22 support a U-shaped spring clamp 24 fastened as at 25 to the said hooks.

In use the device is attached as shown in Fig. 1 and the stakes driven into good ground a short distance forwardly or rearwardly of the driving wheel or wheels. The member P is applied as shown in Fig. 1 and the member C connected with the stake. When the driving wheel is started a pull is exerted on the member P and the free end thereof being fixed causes the driving wheel or wheels to rise upon the said member P out of the stalled position. The transverse portions 14 of the member P prevent skidding of the driving wheels when removed from the mired position. As the driving wheel passes over the clamp 24 it is gripped thereby, connecting the member to the driving wheel to form an anti-skid chain.

I desire to direct particular attention to the fact that the device of my invention provides, semi-automatically, a trackway for the driving wheels as the same are withdrawn from the mired position thereby removing the difficulties encountered in using devices similar to this wherein the wheels will be caused to skid. The provision of the trackway also obviates the necessity of placing boards or other articles under the driving wheels when withdrawing the vehicle from the stalled position. Another point to which I direct attention is that a motor-vehicle may be removed from a stalled position by one person, and that the rescuing device automatically connects itself to the driving wheel forming an anti-skid device. If desired a chain may be connected from the stake to the rear axle of the motor-vehicle, so that the stake may readily be withdrawn as the vehicle passes on.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. A device as specified, including the combination of a flexible body, means for connecting one end thereof to a wheel, a stake having spaced arms, and a U-shaped hook member carried by the opposite end of said flexible member to engage said stake.

2. In a device as specified, the combination with a flexible body, of a pair of oppositely extending strap members carried by one end of said body to attach the same to a vehicle wheel, a stake having a pair of spaced arms on one end thereof, and a connecting member carried by the free end of said flexible body comprising spaced parallel arms formed with hooks for engagement with the arms of said stake.

3. In a device as specified, a flexible body connected at one end to a driving wheel, said body having hooks on its free end to engage a stake or the like, and a U-shaped spring clamp carried between the hooks to engage the wheel as the same passes thereover.

4. In a device as specified, a flexible body connected at one end to a vehicle wheel, a pair of hooks carried by the free end of the body to engage a stake, a U-shaped clamp carried between the hooks, said clamp being disposed vertically in the path of movement of the wheel, whereby to connect the free end of the chain to said wheel and afford an anti-skid element.

In testimony whereof, I affix my signature hereto.

FREDDRICK S. PATTISON.

Copies of this patent may be obtained for five cents each, by addressing the "Commissioner of Patents, Washington, D. C."